US011487949B2

(12) United States Patent
Ekambaram et al.

(10) Patent No.: US 11,487,949 B2
(45) Date of Patent: *Nov. 1, 2022

(54) IMAGE OBJECT DISAMBIGUATION RESOLUTION USING LEARNER MODEL BASED CONVERSATION TEMPLATES

(71) Applicant: International Business Machines Corporation, Armonk, NY (US)

(72) Inventors: Vijay Ekambaram, Bangalore (IN); Prasenjit Dey, Bangalore (IN); Ravindranath Kokku, Yorktown Heights, NY (US); Ruhi Sharma Mittal, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 3 days.

This patent is subject to a terminal disclaimer.

(21) Appl. No.: 17/137,779

(22) Filed: Dec. 30, 2020

(65) Prior Publication Data

US 2021/0117628 A1    Apr. 22, 2021

Related U.S. Application Data

(63) Continuation of application No. 16/267,936, filed on Feb. 5, 2019, now Pat. No. 10,956,682.

(51) Int. Cl.
*G06F 40/30* (2020.01)
*G06K 9/62* (2022.01)
(Continued)

(52) U.S. Cl.
CPC .......... *G06F 40/30* (2020.01); *G06K 9/6267* (2013.01); *G06N 5/048* (2013.01); *G06V 10/768* (2022.01)

(58) Field of Classification Search
CPC ........ G06F 40/30; G06F 16/55; G06K 9/6267
(Continued)

(56) References Cited

U.S. PATENT DOCUMENTS 6,584,223 B1   6/2003  Shiiyama
8,213,726 B2   7/2012  Kohli et al.
(Continued)

OTHER PUBLICATIONS

Yining L et al. Learning to Disambiguate by Asking Discriminative Questions; Source: arXiv : 1708.02760v1 [cs.CV], Published on Aug. 9, 2017. Publisher: Cornell University Library.
(Continued)

*Primary Examiner* — Susan I McFadden
(74) *Attorney, Agent, or Firm* — Ryan, Mason & Lewis, LLP (57) ABSTRACT

Methods, systems, and computer program products for image object disambiguation resolution are provided herein. An example of a method includes: obtaining a group of classification labels and corresponding confidence values for an object in an image; using a wordweb to determine one or more properties that distinguish between at least a first one of the classification labels and at least a second one of the classification labels within the group; selecting a first property from the properties to generate a question based on information indicating a level of prior knowledge of the user with each of the properties and each of the one or more labels; assigning a belief score to an answer; and determining whether to present at least a second question to verify the first answer based on a comparison of the belief score to a belief threshold value.

20 Claims, 8 Drawing Sheets

(51) Int. Cl.
*G06N 5/04* (2006.01)
*G06V 10/70* (2022.01)

(58) Field of Classification Search
USPC .......................................................... 704/9
See application file for complete search history.

(56) References Cited

U.S. PATENT DOCUMENTS

| | | | |
|---|---|---|---|
| 9,654,303 B2 | 5/2017 | Joyner et al. | |
| 10,162,886 B2 | 12/2018 | Wang et al. | |
| 10,275,687 B2 | 4/2019 | Dey et al. | |
| 10,354,543 B2 | 7/2019 | Chetlur et al. | |
| 10,915,795 B2* | 2/2021 | Ekambaram | G06K 9/6267 |
| 10,956,682 B2* | 3/2021 | Ekambaram | G06F 40/30 |
| 2014/0247977 A1 | 9/2014 | Han | |
| 2015/0149155 A1 | 5/2015 | Zadeh | |
| 2015/0310301 A1 | 10/2015 | Zadeh | |
| 2016/0171682 A1 | 6/2016 | Abedini et al. | |
| 2016/0283587 A1 | 9/2016 | Murthy et al. | |
| 2017/0076222 A1 | 3/2017 | Khapra et al. | |
| 2017/0293725 A1 | 10/2017 | Liu et al. | |
| 2018/0150444 A1 | 5/2018 | Kasina | |
| 2018/0181881 A1 | 6/2018 | Du et al. | |
| 2019/0164240 A1 | 5/2019 | Barbara | |
| 2019/0370613 A1 | 12/2019 | Arngren et al. | |
| 2020/0042824 A1 | 2/2020 | Marder et al. | |
| 2020/0082168 A1 | 3/2020 | Fathi et al. | |

OTHER PUBLICATIONS

Szegedy, C., Vanhoucke, V., Ioffe, S., Shlens, J., & Wojna, Z. (2015). Rethinking the inception architecture for computer vision. arXiv preprint arXiv:1512.00567.

GuessWhat?! Visual object discovery through multi-modal dialogue, https://arxiv.org/pdf/1611.08481.pdf, Feb. 6, 2017.

Noh et al. Image Question Answering using Convolutional Neural Network with Dynamic Parameter Prediction; https://www.cv-foundation.org/openaccess/content_cvpr_2016/papers/oh_Image_Question_Answering_CVPR_2016_paper.pdf, 2016.

Zhang et al. Yin and Yang: Balancing and Answering Binary Visual Questions, https://arxiv.org/pdf/1511.05099.pdf, Apr. 19, 2016.

Agrawal et al. VQA: Visual Question Answering; https://arxiv.org/pdf/1505.00468v6.pdf, Apr. 20, 2016.

Wang et al. Knowledge Guided Disambiguation for Large-Scale Scene Classification with Multi-Resolution CNNs; https://arxiv.org/pdf/1610.01119.pdf, Feb. 21, 2017.

Mostafazadeh et al. Generating Natural Questions About an Image; https://arxiv.org/pdf/1603.06059.pdf, Jun. 9, 2016.

Li et al. Visual Question Generation as Dual Task of Visual Question Answering; https://arxiv.org/pdf/1709.07192.pdf, Sep. 21, 2017.

Ekambaram et al. "Tell Me More: Digital Eyes to the Physical World for Early Childhood Learning." EDM 2017.

Mostafazadeh et al. Image-Grounded Conversations: Multimodal Context for Natural Question and Response Generation, Apr. 20, 2017.

List of IBM Patents or Applications Treated as Related.
List of IBM Patents or Patent Applications Treated as Related.

* cited by examiner

FIG. 8

IMAGE OBJECT DISAMBIGUATION RESOLUTION USING LEARNER MODEL BASED CONVERSATION TEMPLATES

CROSS-REFERENCE TO RELATED APPLICATIONS

The present application is a continuation of U.S. patent application Ser. No. 16/267,936, filed Feb. 5, 2019, which is incorporated by reference herein in its entirety.

BACKGROUND

The present application generally relates to information technology and, more particularly, to image recognition techniques.

Commonly, people learn when they are involved in activities. Using physical-digital coupling, people can attach words to the things that they experience.

Current learning applications with physical-digital interaction generally fall into two categories: application-initiated activities and user-initiated activities. In application-initiated activities, an application provides the user a context, and the user is required to, for example, find a relevant physical object and take a picture. In user-initiated activities, the user takes a picture of an object that the user wants to know more about. However, few applications allow interaction with a user through digital objects.

SUMMARY

In one example embodiment of the disclosure, techniques for image object disambiguation resolution using learner model based conversation templates are provided. An exemplary computer-implemented method includes obtaining a group of classification labels and corresponding confidence values for at least one object identified within an image using a computer-based object recognition technique; in response to determining that each of the confidence values is less than a confidence threshold value, using a wordweb to determine one or more properties that distinguish between at least a first one of the classification labels and at least a second one of the classification labels within the group; selecting a first one of the properties to generate and output a first question to a user, wherein said selecting is based at least in part on information indicating a level of prior knowledge of the user regarding (i) each of the one or more properties and (ii) each of the one or more classification labels; assigning a belief score to an answer input by the user in response to the first question, wherein the belief score is based at least in part on the level of prior knowledge of the user regarding the first property; determining whether to present at least a second question to the user to verify the answer based at least in part on a comparison of the belief score to a belief threshold value; and removing at least one of (i) the first classification label and (ii) the second classification label from the group of classification labels when the belief score exceeds the threshold value.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As noted in herein, few learning applications allow interaction with a user through digital objects. Some challenges in implementing such applications include, for example, accurate detection of objects in images and detecting particular objects in noisy images (i.e., images which include multiple objects in a frame). Also, there is a possibility that a user may provide unexpected or incorrect user input, such as answering a simple question incorrectly. For example, if the question is relied upon to disambiguate objects within an image, then reliance on this unexpected/incorrect user input could lead to misclassification of the object. Further challenges include, for example, how to interact with a user in a simple and personalized manner, and how to handle incomplete information (such as when there is an incomplete wordweb, as discussed in more detail below).

Various exemplary embodiments herein describe techniques for image object recognition through multimodal conversation templates, which address these and other challenges.

As described herein, at least one example embodiment includes automatically discovering and generating personalized conversations with a user with minimal length at runtime to resolve confusions in vision-recognition-output inferences of object recognition systems. Information related to an opportunistic learner model of a user(s) and word-embedding-representation may be leveraged for generating personalized questions that are output to a user, and also for enabling auto-remediation in case of a wrong answer or an incomplete wordweb edge.

Figure 1:
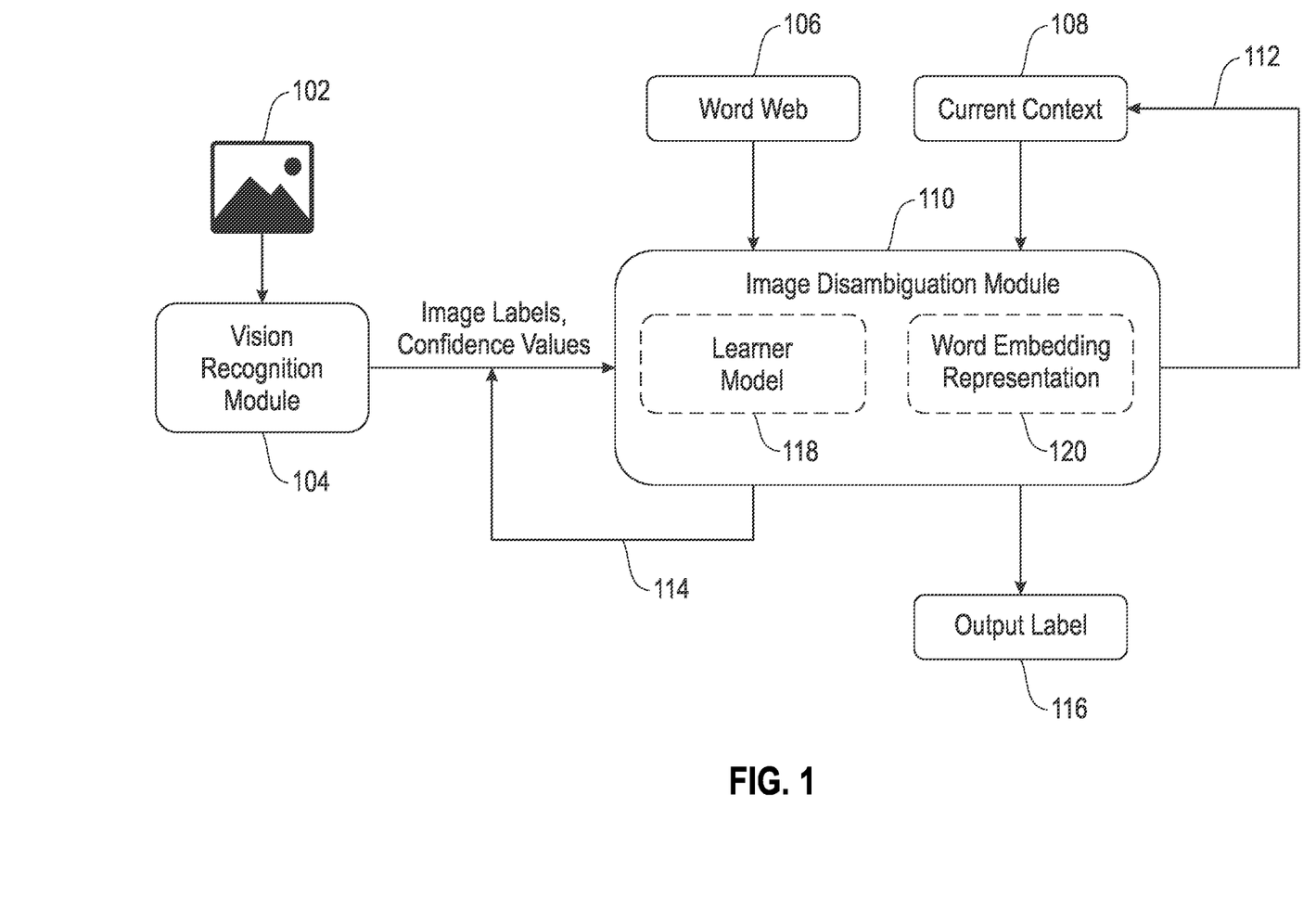
FIG. 1 is a diagram illustrating system architecture, according to an exemplary embodiment of the invention.

Referring to FIG. 1, this figure is a simplified block diagram illustrating a system architecture according to various example embodiments of the invention. By way of illustration, FIG. 1 depicts a vision recognition module 104 that analyzes an image 102 to generate a set of image labels and corresponding confidence values for classifying (or identifying) at least one object within the image 102.

FIG. 1 also includes an image disambiguation module 110 for disambiguating two or more of the image labels, when confusion exits across the set of image labels, through multimodal conversations. The image disambiguation module 110 may, for example, generate and output 112 a question to the user by leveraging knowledge in a wordweb 106. The generated output 112 may also be based at least in part on the current context 108 corresponding to one or more previous questions output by the image disambiguation module 110 and the user's response to those questions.

The image labels and confidence scores are updated 114 based on the current context 108. The updating 114 may include removing image labels and/or changing one or more of the confidence scores. In some examples, the process is repeated until there is only one image label remaining in the set of image labels. If the corresponding confidence value exceeds a threshold confidence value, then the image disambiguation module 110 may label the at least one object in the image 102 based on the output label 116.

In some example embodiments, the image disambiguation module 110 may also leverage one or more of: a learner model 118 and word embedding representation 120, which allow the image disambiguation module 110 to, for example, generate personalized questions for the user and/or handle one or more of a wrong answer context or incomplete wordweb edge context. Various features of FIG. 1 are now described in more detail below.

In some examples, the set of image labels output by vision recognition module 104 include the top-k predicted image labels for the object in image 102, and the corresponding confidence values (which also may be referred to as confidence scores) include a level of confidence that an object has been identified correctly. As an example, if an image 102 includes a tiger, then the set of image labels may be: {Tiger, Pig, Zebra, Dog}, and the set of corresponding confidence levels may be: {0.7, 0.1, 0.6, 0.5}. For this example, the sets indicate that the vision recognition module is: 70% confident that the object in the image is a tiger, 10% confident that the object in the image is a pig, 60% confident that the object in the image is a zebra, and 50% confident that the object in the image is a dog. It is noted that this is merely an example, and the output of the vision recognition module 104 may be structured differently depending on the implementation, such as: {<Tiger, 0.7>, <Pig, 0.1>, <Zebra, 0.6>, <Dog, 0.5>} or {Tiger(0.7), Pig(0.1), Zebra(0.6), Dog(0.5)}, as non-limiting examples.

As noted above, the image disambiguation module 110 may leverage the knowledge of a wordweb 106 (or, possibly, multiple wordwebs) to intelligently generate question(s). A 'wordweb' (e.g., wordweb 106) as used herein generally refers to a network of words and semantic relationships between the words. According to some example embodiments, a wordweb takes the form of a graph where each node in the graph corresponds to a different word. The wordweb may include 'entity nodes' and 'property nodes,' wherein the entity nodes represent primary objects whose properties are being learned, and the property nodes represent properties of the different entity nodes. An 'edge' in the wordweb defines a relationship (e.g., semantic relationship) between a property node and an entity node. Some non-limiting examples of relationships between two nodes (i.e., words) in a wordweb include, for example: atLocation (e.g., "Giraffe atLocation Grassland"); hasA (e.g., "Bicycle hasA Wheel"); isA (e.g., "Lion isA mammal"); capableOf (e.g., "Flamingo capableOf Flying"); and UsedFor (e.g., "Car UsedFor Transport"). According to some example embodiments, a wordweb may be specially curated for a specific group of users (such as for a particular age group of users, for example). Although example embodiments are generally described herein as implementing wordwebs, this is not intended to be limiting, and, in general, embodiments may also be implemented using any suitable knowledge graph.

Figure 2:
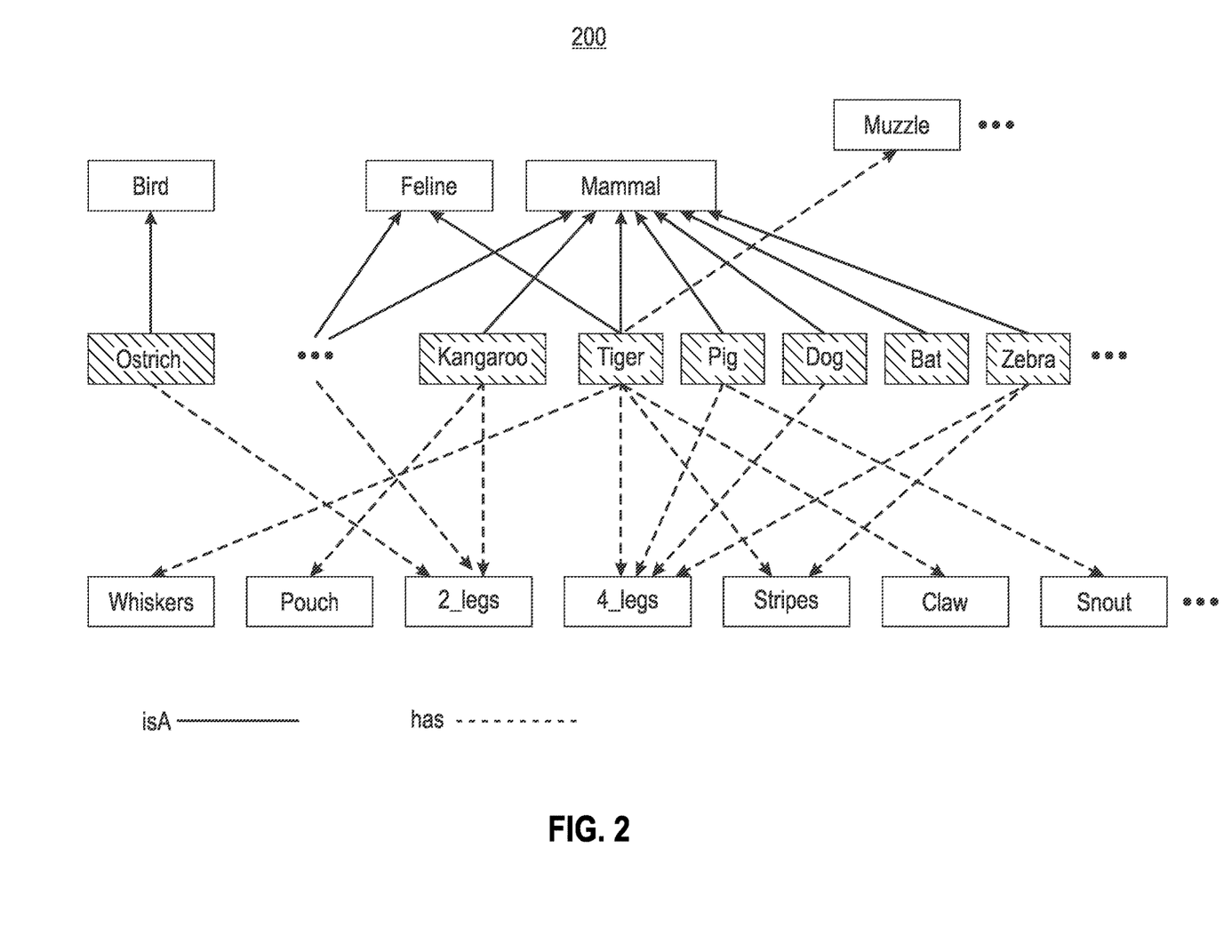
FIG. 2 is a diagram illustrating an example of a wordweb, according to an exemplary embodiment of the invention.

FIG. 2 shows an example of a wordweb in accordance with various example embodiments. The wordweb 200 includes entity nodes (i.e., nodes with darker shading) corresponding to words of different animals, and property nodes (i.e., unshaded nodes) corresponding to different properties of the different animals. The dotted arrows indicate a 'hasA' relationship and the solid arrows indicate an 'isA' relationship between nodes. Thus, it can be determined from wordweb 200 that, for example, a 'tiger' is a mammal, and has a muzzle, four legs, whiskers, stripes, and a claw. It is noted that only part of the wordweb 200 is shown, and other animals, properties, and/or relationships may be included in the wordweb 200.

According to at least one example embodiment, different parameters (such as corresponding to different properties in a wordweb) are used for intelligently prioritizing and/or selecting the nodes in the wordweb. The selected nodes are then used to form questions. The parameters may include, for example:

- a parameter corresponding to the number of connections between a given node and nodes in the 'confused' set of entity nodes; i.e., those entity nodes where confusion exists (selecting nodes based on this parameter generally effects the amount of turns in the conversation);
- a parameter corresponding to the number of connections between a given node and all entity nodes (selecting nodes based on this parameter generally relates to how likely the user is to understand a node);
- a parameter related to confidence values of various image labels; and/or
- a parameter corresponding to different relationships defined by the wordweb (such as whether nodes are connected via an isA relationship, a hasA relationship, etc.).

The parameters may be prioritized differently for different algorithms when selecting the nodes. As a non-limiting example, the following algorithm may be used:

1. Sort the property nodes in the wordweb based on the number of connections between a given property node and the confused set of entity nodes to prioritize nodes that help reduce the total number of conversation turns.
2. Sort the property nodes with the most connections from step 1 based on the number of connections to all entity nodes in the wordweb to prioritize the nodes related to more 'common' properties that thus may be more familiar to the user.
3. For property nodes having the same number of connections for step 2, sort the property nodes based on corresponding confidence values of the entity nodes.

It should be understood that the algorithm above is merely an example, and other algorithms to select and/or prioritize the nodes are equally suitable, such as using different parameters and/or sorting using different orders of parameters, for instance. In some examples, the parameters may also include parameters relating to learner models, word embedding representations, and/or other graph heuristics to select questions at each level of conversation.

According to some example embodiments, the combination of the one or more parameters may be selected opportunistically, taking into account the dynamic characteristics of each parameter. For example, the selection can be made by fusing multiple parameters (such as wordweb, learner model, and/or context parameters) based on availability. In some examples, if a value of one parameter is not available, then the same information is gathered using other parameters. Similarly, if values of some parameters indicate the same information, then the confidence in that information may be increased. For example, if a value of a learner model is available for a given word, then this may be used and given the highest priority. In case the value of the learner model is not available, then the algorithm may dynamically use graph heuristics to retrieve information about the word. If both of the values (from the learner model and graph heuristics) indicate the same information, then the confidence of that information may be increased. The node having the highest priority may then be selected to generate the output (e.g., a question), which is then presented to the user.

In accordance with some example embodiments, when a user's response (e.g., answer) is received (such as via a user input) the current context 108 is updated. One or more image labels may be removed from the set of image labels, and/or the confidence values of one or more of the image labels may be updated based on the updated context. If confusion still exists among the remaining labels, then questions are iteratively generated until the size of the set of image labels becomes one. If there are no questions to be generated, then the confidence value corresponding to the one remaining image label is compared to a threshold value. If the confidence value is greater than (or equal to) the threshold value, then the object is classified with the corresponding image label (and possibly output to the user). If the corresponding confidence value does not exceed the threshold value, then the process may terminate and a fallback mechanism may be utilized. For example, the fallback mechanism may include generating a message to the user indicating that the object cannot be classified, or generating additional questions to present to the user for confirming that a label is correct.

According to some example embodiments, a learner model (e.g., learner model 118) may be tracked for a specific user. For example, the learner model 118 is based on the user's historical learning behavior, such as the user's learning patterns and/or assessments (such as user's exam scores for various syllabi, for example). According to some example embodiments, the learner model provides scores which indicate how confident the user knows certain concepts. The learner model may then be leveraged to prioritize the parameter selection using the user's score associated with the concepts related to the parameters. According to one example embodiment, the nodes are sorted based on the learner confidence score such that questions which are very easy to answer are generated first. Thus, questions which have a high chance of the user knowing the answer to may be prioritized.

Figure 3:
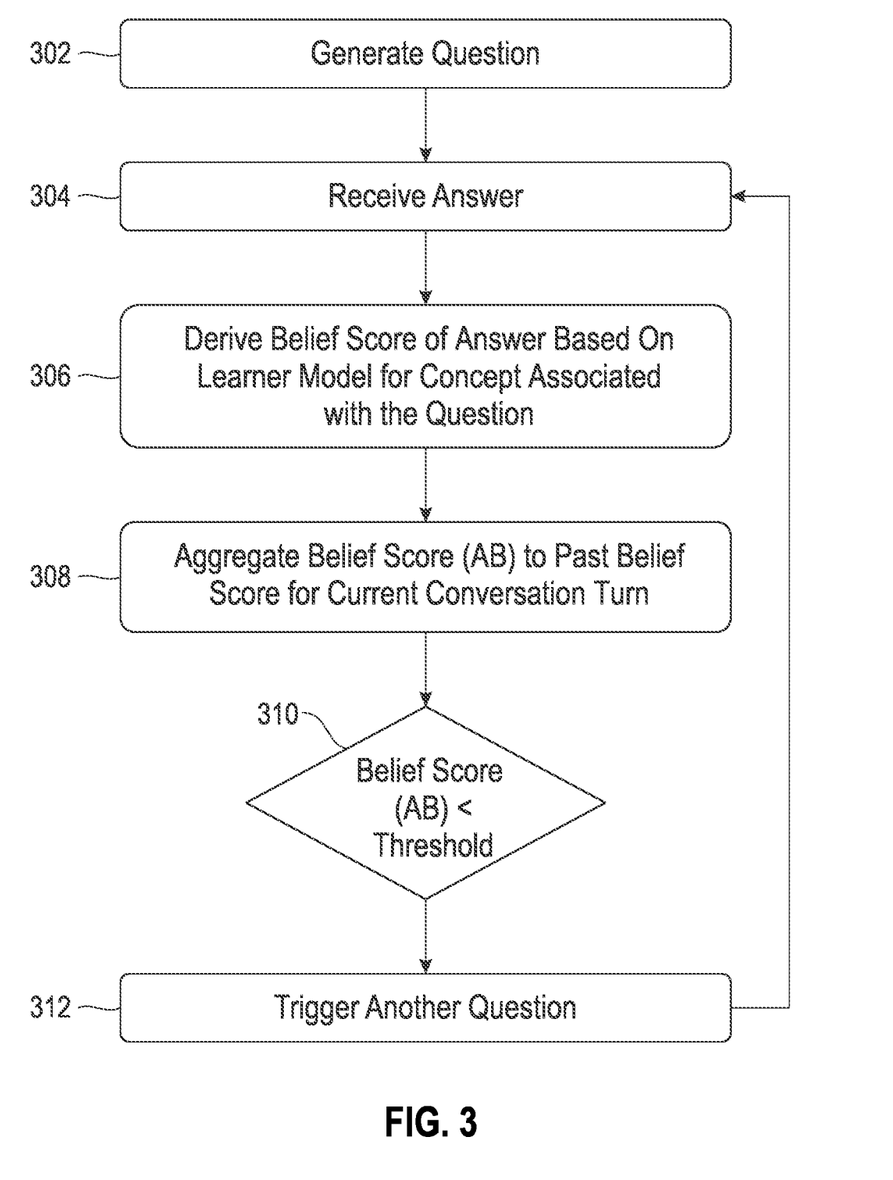
FIG. 3 is a process flow diagram in accordance with exemplary embodiments of the invention.

Referring now to FIG. 3, this figure shows a process flow diagram in accordance with at least one example embodiment. The process flow diagram may help address the situation when a user answers a question incorrectly that could lead to the incorrect label selection. At step 302, a question is generated (such as described above with reference to image disambiguation module 110, for example) and the user provides an answer to the question at step 304. At step 306, a 'belief score' is derived for the user's answer based on the score from the user's learner model (e.g., learner model 118) for the concept associated with the question. At step 308, an aggregated belief score is determined by aggregating the belief score from step 306 with previously determined belief scores (such as averaging all previous belief scores, for example). A higher learner score for a particular concept leads to a higher belief score for answers associated with that concept. At step 310, the aggregated belief score is compared to a threshold value. At step 312, if the belief score is below the threshold value, then additional dependent questions may be generated and presented to the user, such as to validate the user's answer through other parameters. In some example embodiments, the belief score is aggregated across the primary and dependent questions to confirm an inference until the aggregated belief score crosses the threshold value.

As a non-limiting example, assume a user provides an image of a tiger, and a question is generated asking the user "Does it have stripes?" If the learner model score of "stripes" is low, then additional questions may be generated before concluding the output label is "tiger." For example, the additional questions related to tiger may help boost the aggregated belief score until it can be confirmed that the output label is "tiger." The amount by which the belief score is increased depends on, for example, the learner model score associated with the nodes.

Figure 4:
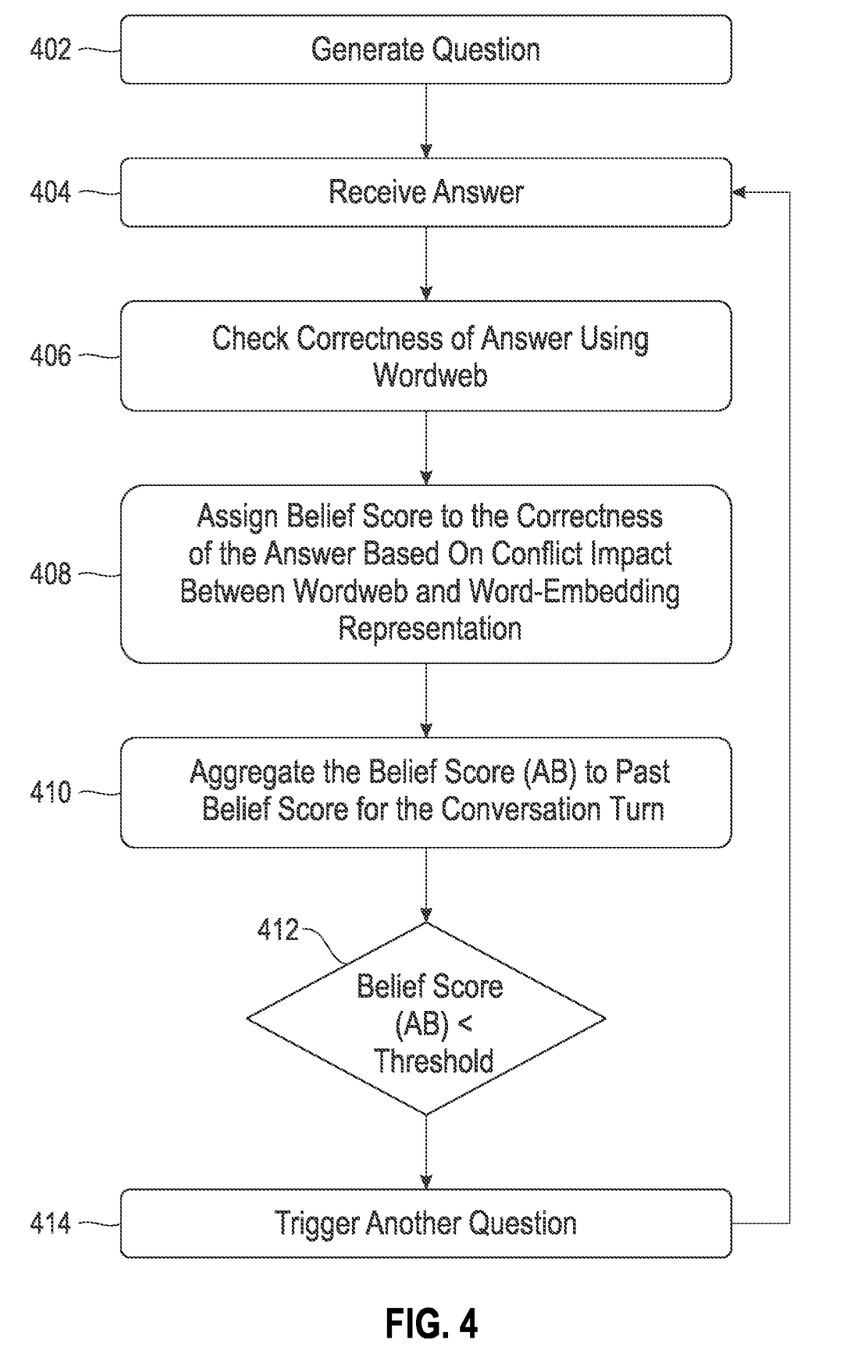
FIG. 4 is another process flow diagram in accordance with exemplary embodiments of the invention.

Referring now to FIG. 4, this figure shows another process flow diagram in accordance with at least one example embodiment. The process flow diagram helps address the situation when there are incomplete edges present in the wordweb, thus making the system more robust. Similar to FIG. 3, a question is generated at step 402 and an answer to the question is received at step 404. At step 406, the correctness of the answer is checked using the wordweb. For example, the system may assign the answer a belief score when at least one of the following scenarios occur:

An edge is missing between two words in the wordweb and its word-embedding-representation association score is high (such as being above a threshold value, for example); and An edge is present between two words in the wordweb, and a word-embedding-representation associated with the two nodes is low (such as being below a threshold value, for example).

It is noted that a word-embedding representation (e.g., word embedding representation 120) is a representation of a word that shows the relationship between the word and a corpus of other words. For example, the representation may be a word2vec representation, wherein the word is represented as a vector within a vector space, where vectors are positioned in the vector space such that words sharing common contexts in the corpus are located in close proximity within the vector space. At step 408, the belief score is calculated and assigned to the correctness of the user's answer. The belief score is calculated based on the conflict impact between a wordweb edge score and a word-embedding score across words. For example, an annotator may manually test at least part of the wordweb to determine how complete the wordweb is, and then assign a confidence score indicating how complete the wordweb is. According to at least one example embodiment, the wordweb confidence score is a value between 0 and 1. In at least one example, the wordweb confidence score corresponds to a percentage value that estimates how complete the entire graph is. In some examples, each edge is assigned an edge score that is equal to the wordweb confidence score. In some examples, the wordweb confidence score or the edge scores may be assigned and/or updated using other techniques, such as crowd-sourced testing, for example. As a non-limiting example, each edge in the wordweb may be assigned an edge score equal to the overall wordweb confidence score, then the individual edge scores may be updated via crowd-sourced testing.

At step 410, an aggregated belief score is determined by aggregating the belief score from step 406 with previously determined belief scores. At step 412, the aggregated belief score is compared to a threshold value. At step 414, if the belief score is below the threshold value then additional dependent questions may be generated and presented to the user, such as to validate the user's answer through other parameters. Accordingly, multiple questions may be generated before drawing an inference. It is noted that a length of the conversation (e.g., the amount of questions-answers) may depend at least in part on the conflict impact across the wordweb and word-embedding-representation. It is noted that in some example embodiments, a combination of the processes from FIGS. 3-4 may also be utilized.

As a non-limiting example, assume there is confusion between a tiger image label and a kangaroo image label. Also assume that fur is associated with "tiger" and not associated with "kangaroo" in the wordweb, and that the word-embedding-representation association score between "kangaroo" and "fur" is very high. In this example, disambiguation between the tiger and kangaroo image labels should not be determined based simply on the question "Does it have fur?" As such, additional questions are triggered before reaching the conclusion, such as, for example, "Does it have stripes?"

In this case, the length of the conversation may depend at least in part on the difference index between the wordweb and word-embedding-representation scores.

According to at least one example embodiment, the learner model is represented as a set or an array of words and a corresponding set or array of scores. For example, assume the learner model for a specific user is represented as:

Words=[bird, feline, mammal, ostrich, kangaroo, tiger, pig, dog, bat, pouch, 2_legs, 4_legs, stripes, claw, snout, muzzle, . . . ]

Score=[0.3, 0.2, 0.6, 0.1, 0.8, 0.7, 0.6, 0.2, 0.1, NULL, 0.9, 0.8, 0.7, 0.1, 0.2, 0.9, . . . ]

In this example, a score closer to 0 indicates that the system user has no exposure to the word, and a score closer to 1 indicates the user has mastered the word. In this example, the user's scores for 'pouch' and '2_legs' are 0.0 and 0.9, respectively, indicating that the user is close to mastering the words 2_legs, but either does not understand or has not been exposed to the term 'pouch'. Also, the NULL value indicates that the learner proficiency for pouch is not yet known.

An example relevant to one or more features of various embodiments is now described with reference to the learning model above and wordweb 200. Assume a user identifies an image of a tiger (such as by clicking on the image, uploading the image, and/or the like). In this case, the image of the tiger is analyzed (such as by vision recognition module 104, for example) and the following labels and confidence values are output: tiger(0.60), pig(0.62), kangaroo(0.63), zebra(0.10), cat(0.09). Assume that image labels below the threshold value of 0.2 are removed; namely, the image labels for the zebra and the cat. After removing the zebra and cat image labels, the remaining labels are tiger(0.60), pig(0.62) and kangaroo(0.63). The image disambiguation module 110 determines the following differentiating properties based on wordweb 200:

(1) "Kangaroo" has 2_legs; "tiger" and "pig" have 4_legs;
(2) "Tiger" is a feline, and "pig" and "kangaroo" are not felines; and
(3) "Kangaroo" has a pouch, whereas "pig" and "tiger" do not have a pouch.

For (2), 'feline' is not selected because the learner model score of the word "feline" is 0.2, which means the user does not sufficiently understand the concept of "feline." For (3), pouch is not common (i.e., it has a relatively lower number of incoming edges in the wordweb ontology), and so a question related to 'pouch' is not prioritized. Note that the learner score is also not known for pouch (i.e., the score is a NULL value), which is why graph heuristics may be used instead, for example. For (1), the concepts of 2_legs and 4_legs are well known in the learner model and also relatively common. Thus, the word 4_legs in wordweb 200 is selected, as it has a relatively higher number of incoming edges as compared to 2_legs and pouch.

The image disambiguation module 110 then generates the question "Does it have 4_legs?" and presents it to the user. If the user replies "yes," then "Kangaroo" is removed from the label list and the confidence scores of "Tiger" and "Pig" are increased by some amount, such as 0.1, for example. Subsequently, the image disambiguation module 110 may determine the following differentiating properties for the remaining image labels using the wordweb 200:

(1) "tiger" has stripes, "pig" does not have stripes; and
(2) "tiger" has a muzzle, "pig" has a snout.

In this case, a question regarding 'snout' is not selected because the user's learner model score for snout is low (i.e., 0.2). The 'stripes' node has more incoming edges than the 'muzzle' and 'snout' nodes, and also has a relatively higher learner model score (i.e., 0.7). So, in this example, the question "Does it have stripes?" is generated and presented to the user. If the user replies "yes," then the confidence score of "Pig" is reduced by some value (e.g., 0.1) because the word embedding score between "pig" and "stripes" is relatively higher. If the word embedding score between "pig" and "stripes" is relatively low, then "pig" may be eliminated, or the confidence score may be reduced further.

Continuing this example, assume that the filtered label list is Tiger(0.8), Pig(0.6). If the confidence threshold is 0.85, then the image still cannot be labeled as a tiger because the confidence score for tiger (i.e., 0.8) is below this confidence threshold. To confirm that the image is of a "tiger," at least one embodiment generates another question related to tigers, and presents it to the user. For example, in at least one embodiment, the question "Does it have a muzzle?" is presented to the user because the learner model score for "muzzle" is relatively high. If the user's reply is "yes," then the confidence score is again increased, such as by 0.1, for example. Now the confidence score of tiger is 0.90, which is greater than the threshold value of 0.85. In some examples, the confidence score for "pig" is also reduced further based on conflict impact score differences. Output may then be provided to the user indicating that the uploaded image was labeled as a tiger.

It is noted that the confidence values in the example above are increased by a static number (i.e., 0.1) in response to the user's answer; however, this is not intended to be limiting and the confidence values may be increased in other ways and/or by other values, such as via user configuration and/or dynamically depending on how many labels are removed from the list.

Figure 5:
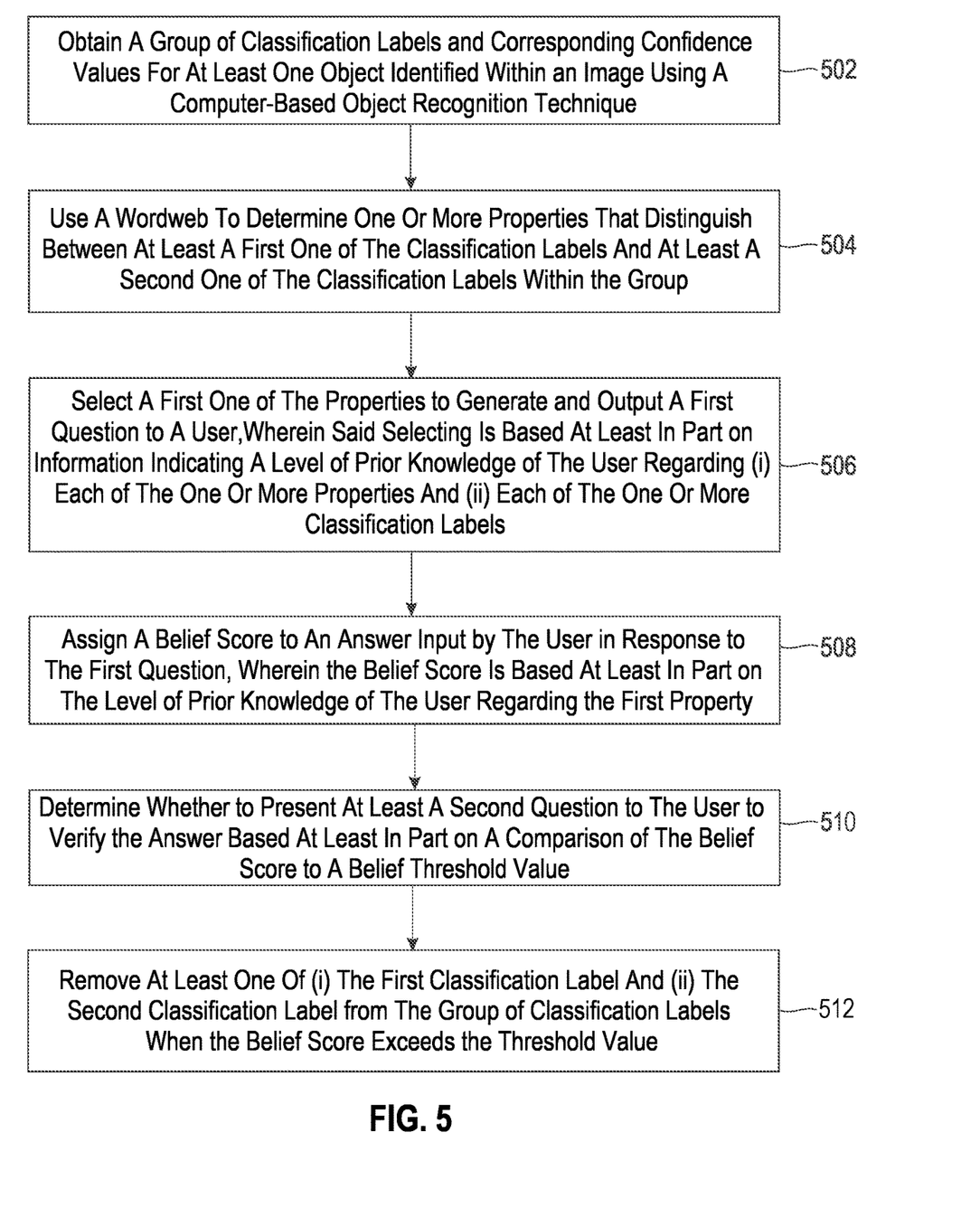
FIG. 5 is a flow diagram illustrating techniques according to an embodiment of the invention.

FIG. 5 is a flow diagram of a process according to an embodiment of the present invention.

Step 502 of the process includes obtaining a group of classification labels and corresponding confidence values for at least one object identified within an image using a computer-based object recognition technique.

Step 504 includes, in response to determining that each of the confidence values is less than a confidence threshold value, using a wordweb to determine one or more properties that distinguish between at least a first one of the classification labels and at least a second one of the classification labels within the group.

Step 506 includes selecting a first one of the properties to generate and output a first question to a user, wherein said selecting is based at least in part on information indicating a level of prior knowledge of the user regarding (i) each of the one or more properties and (ii) each of the one or more classification labels.

Step 508 includes assigning a belief score to an answer input by the user in response to the first question, wherein the belief score is based at least in part on the level of prior knowledge of the user regarding the first property.

Step 510 includes determining whether to present at least a second question to the user to verify the answer based at least in part on a comparison of the belief score to a belief threshold value.

Step 512 includes removing at least one of (i) the first classification label and (ii) the second classification label from the group of classification labels when the belief score exceeds the threshold value.

The wordweb may include a graph comprising at least: first nodes corresponding to at least the group of classification labels, second nodes corresponding to at least the one or more properties, and edges defining relationships between the first nodes and the second nodes. The process may include adjusting the belief score based at least in part on a correlation between (i) a word embedding score between the node corresponding to the first property and the node corresponding to the answer and (ii) an edge confidence score for the edge between the node corresponding to the first property and the node corresponding to the answer. The word embedding score may correspond to a mathematical similarity between (i) a word embedding representation of the node corresponding to the first property and (ii) a word embedding representation of the node corresponding to the answer. The word embedding representations may include word vector representations. The mathematical similarity may include a cosine similarity between the word vector representations. The edge confidence score may be based at least in part on testing performed on the wordweb to determine the completeness of the wordweb. The process may include, in response to determining that the second question is to be presented to the user, selecting, based at least in part on the learner model, a second one of the properties to be used in generating the second question; and adjusting the belief score based at least in part on an answer that is input by the user in response to the second question. The information in the learner model may include at least one set of scores that indicates the levels of prior knowledge of the user with (i) each of the one or more properties and (ii) each of the one or more classification labels. The process may include, in response to determining that the group comprises only one classification label, classifying the object using the one classification label in the group. The process may include tracking user learning patterns during the conversation and updating the learner model of the user based at least in part on said tracking. The process may include receiving the image in response to a user input.

The techniques depicted in FIG. 5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 6:
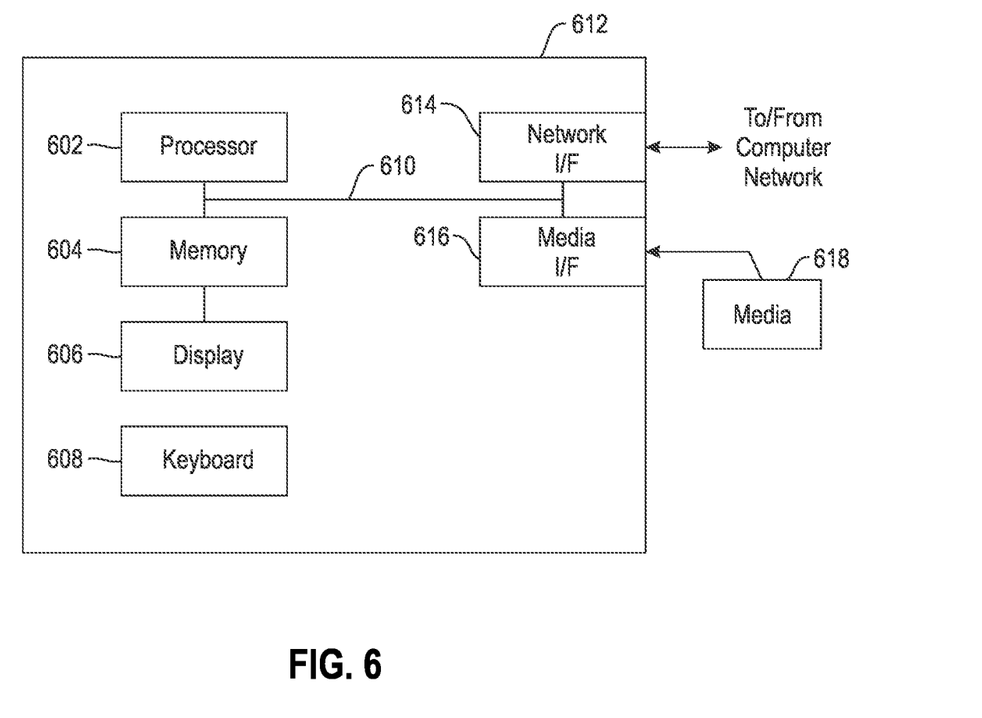
FIG. 6 is a system diagram of an exemplary computer system on which at least one embodiment of the invention can be implemented.

Additionally, an embodiment of the present invention can make use of software running on a computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
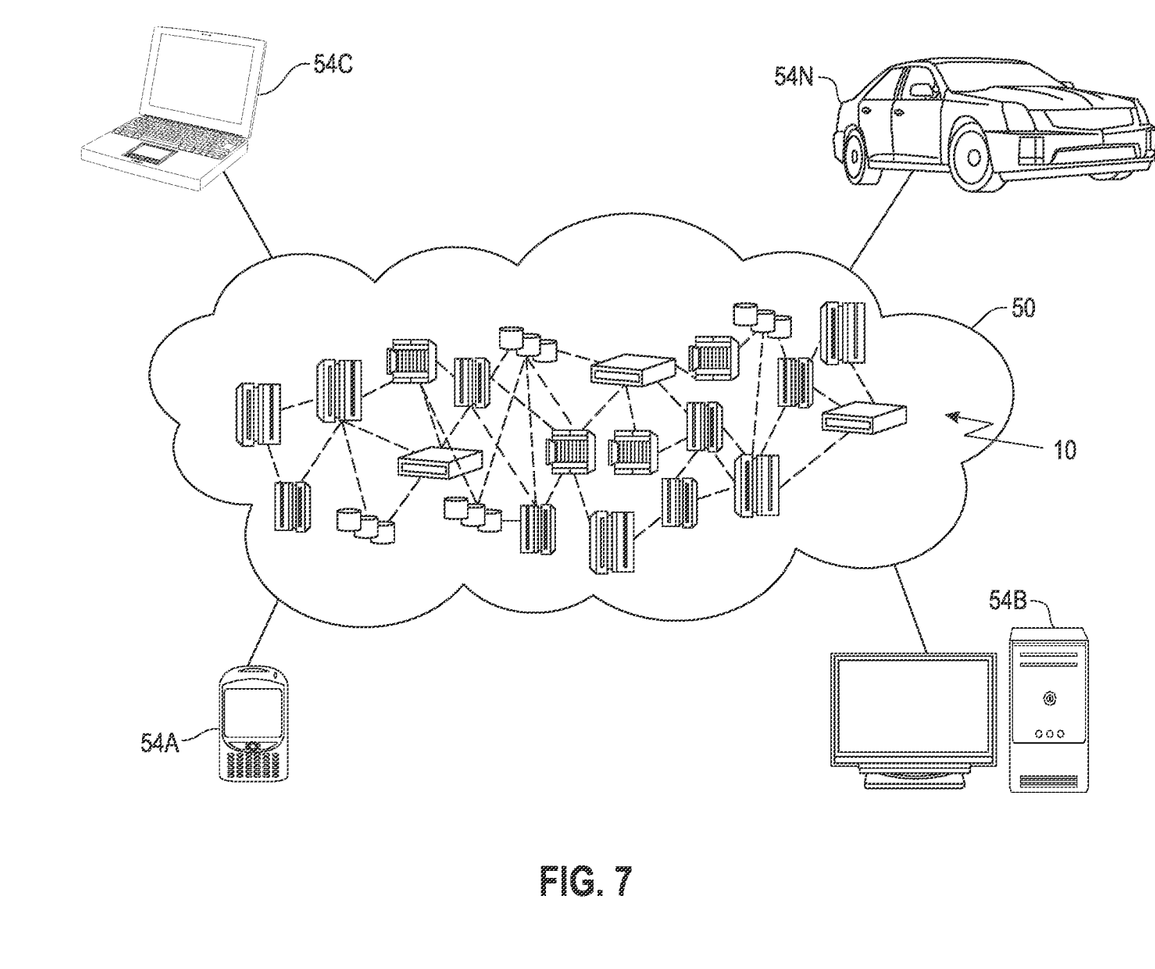
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
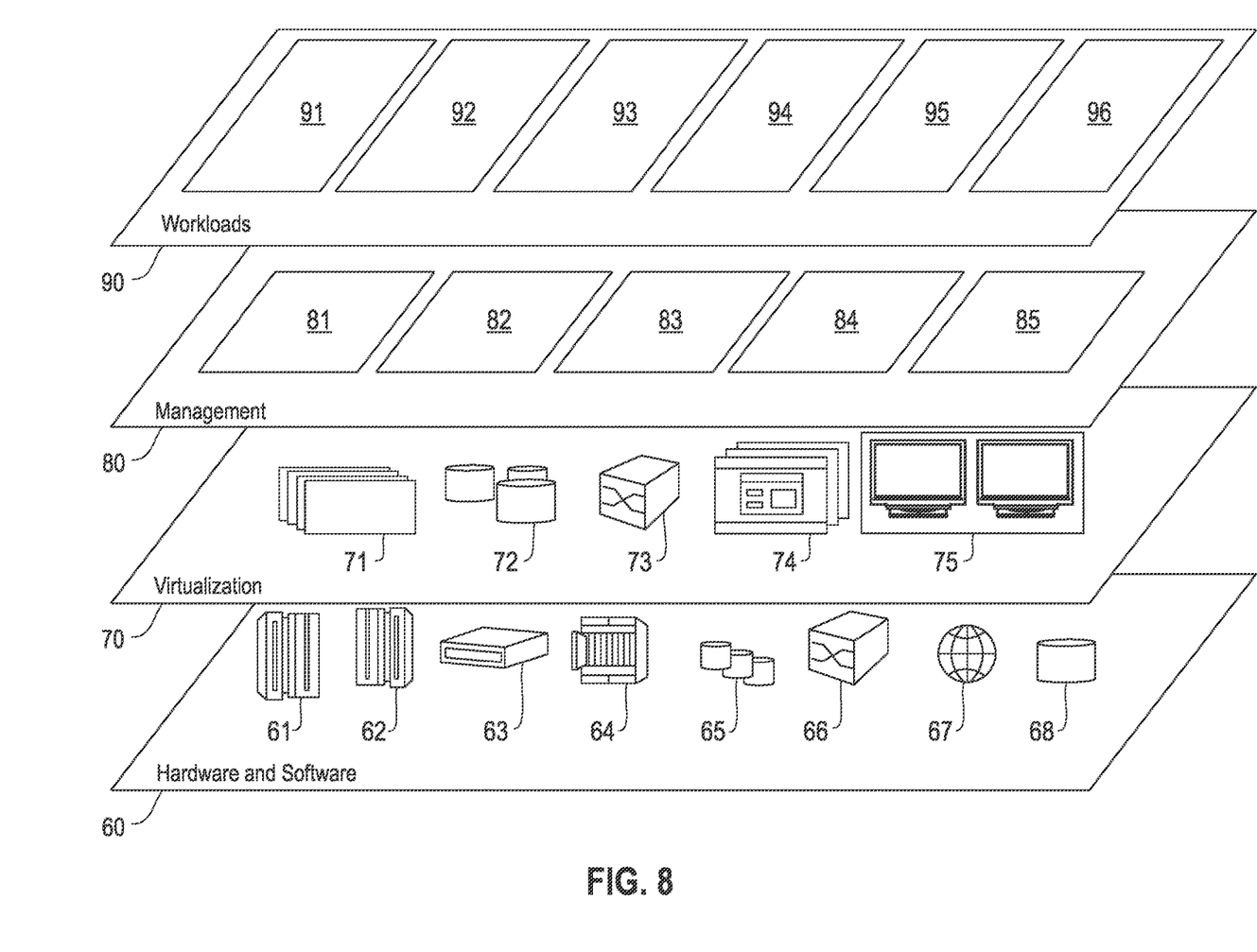
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image object disambiguation resolution using learner model based conversation templates 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

Without in any way limiting the scope, interpretation, or application of the claims appearing below, a beneficial effect of at least one or more example embodiments is resolving disambiguation in object recognition systems through run-time conversation generation from a wordweb(s) which has the least number of turns. Another beneficial effect of one or more example embodiments of the subject matter disclosed herein is improving user interfaces by allowing less user interaction (e.g., by reducing the number of turns) or providing more helpful and understandable output to a user. Another beneficial effect of at least one example embodiment of the subject matter disclosed herein is intelligently generating output for a specific user via the user interface via specially curated wordwebs. Also, a beneficial effect of at least one example embodiment of the subject matter disclosed herein is not requiring large amounts of annotated conversation-labelled data. Additionally, a beneficial effect of at least one embodiment of the subject matter disclosed herein is allowing image labels to be identified by the user when the user provides incorrect or incomplete answers. Further, a beneficial effect of one or more example embodiments of the subject matter disclosed herein is allowing image labels to be identified by the user when there is incomplete information, such as missing edges in a wordweb.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    obtaining a group of classification labels and corresponding confidence values for at least one object identified within an image using a computer-based object recognition process;
    in response to determining that each of the confidence values is less than a confidence threshold value, using a word-based data structured to determine one or more properties that distinguish between at least a first one of the classification labels and at least a second one of the classification labels within the group;
    selecting a first one of the properties to generate and output a first question to a user as part of a computer-guided conversation with the user for resolving ambiguity of the computer-based object recognition process with respect to the at least one object, wherein said selecting is based at least in part on information indicating a level of prior knowledge of the user regarding (i) each of the one or more properties and (ii) each of the one or more classification labels;
    assigning a belief score to an answer input by the user in response to the first question, wherein the belief score is based at least in part on the level of prior knowledge of the user regarding the first property;
    determining whether to present at least a second question to the user to verify the answer based at least in part on a comparison of the belief score to a belief threshold value; and
    removing at least one of (i) the first classification label and (ii) the second classification label from the group of classification labels when the belief score exceeds the threshold value;
    wherein the method is carried out by at least one computing device.

2. The computer-implemented method of claim 1, wherein the word-based data structure comprises a graph comprising at least:
    first nodes corresponding to at least the group of classification labels, second nodes corresponding to at least the one or more properties, and edges defining relationships between the first nodes and the second nodes.

3. The computer-implemented method of claim 2, comprising:
    adjusting the belief score based at least in part on a correlation between (i) a word embedding score between the node corresponding to the first property and the node corresponding to the answer and (ii) an edge confidence score for the edge between the node corresponding to the first property and the node corresponding to the answer.

4. The computer-implemented method of claim 3, wherein the word embedding score corresponds to a mathematical similarity between (i) a word embedding representation of the node corresponding to the first property and (ii) a word embedding representation of the node corresponding to the answer.

5. The computer-implemented method of claim 4, wherein the word embedding representations comprise word vector representations.

6. The computer-implemented method of claim 5, wherein the mathematical similarity is a cosine similarity between the word vector representations.

7. The computer-implemented method of claim 3, wherein the edge confidence score is based at least in part on testing performed on the word-based data structure to determine the completeness of the word-based data structure.

8. The computer-implemented method of claim 1, wherein the information indicating the level of prior knowledge of the user is obtained from a learner model associated with the user.

9. The computer-implemented method of claim 8, comprising:
    in response to determining that the second question is to be presented to the user, selecting, based at least in part on the learner model, a second one of the properties to be used in generating the second question; and
    adjusting the belief score based at least in part on an answer that is input by the user in response to the second question.

10. The computer-implemented method of claim 8, wherein the information from the learner model comprises at least one set of scores that indicates the levels of prior knowledge of the user with (i) each of the one or more properties and (ii) each of the one or more classification labels.

11. The computer-implemented method of claim 8, comprising:
    tracking user learning patterns during a conversation with the user, the conversation comprising at least said first question; and
    updating the learner model of the user based at least in part on said tracking.

12. The computer-implemented method of claim 1, comprising:
    in response to determining that the group comprises only one classification label, classifying the object using the one classification label in the group.

13. The computer-implemented method of claim 1, comprising:
    in response to said removing, adjusting one or more of the confidence values for the classification labels in the group; and
    in response to determining that one of the adjusted confidence values exceeds the confidence threshold, classifying the object using the corresponding classification label.

14. A computer program product comprising a non-transitory computer readable storage medium having program instructions embodied therewith, the program instructions executable by a computing device to cause the computing device to perform at least:
    obtaining a group of classification labels and corresponding confidence values for at least one object identified within an image using a computer-based object recognition process;
    in response to determining that each of the confidence values is less than a confidence threshold value, using a word-based data structure to determine one or more properties that distinguish between at least a first one of the classification labels and at least a second one of the classification labels within the group;
    selecting a first one of the properties to generate and output a first question to a user as part of a computer-guided conversation with the user for resolving ambiguity of the computer-based object recognition process with respect to the at least one object, wherein said selecting is based at least in part on information indicating a level of prior knowledge of the user regarding (i) each of the one or more properties and (ii) each of the one or more classification labels;
    assigning a belief score to an answer input by the user in response to the first question, wherein the belief score is based at least in part on the level of prior knowledge of the user regarding the first property;

determining whether to present at least a second question to the user to verify the answer based at least in part on a comparison of the belief score to a belief threshold value; and removing at least one of (i) the first classification label and (ii) the second classification label from the group of classification labels when the belief score exceeds the threshold value.

15. The computer program product of claim 14, wherein the information indicating the level of prior knowledge of the user is obtained from a learner model associated with the user.

16. The computer program product of claim 15, wherein the program instructions cause the computing device to perform:

in response to determining that the second question is to be presented to the user, selecting, based at least in part on the learner model, a second one of the properties to be used in generating the second question; and adjusting the belief score based at least in part on an answer that is input by the user in response to the second question.

17. The computer program product of claim 15, wherein the information from the learner model comprises at least one set of scores that indicates the levels of prior knowledge of the user with (i) each of the one or more properties and (ii) each of the one or more classification labels.

18. The computer program product of claim 14, wherein the program instructions cause the computing device to perform:

in response to determining that the group comprises only one classification label, classifying the object using the one classification label in the group.

19. A system comprising:

at least one memory; and at least one processor operably coupled to the at least one memory and configured to perform at least:

obtaining a group of classification labels and corresponding confidence values for at least one object identified within an image using a computer-based object recognition process;

in response to determining that each of the confidence values is less than a confidence threshold value, using a word-based data structure to determine one or more properties that distinguish between at least a first one of the classification labels and at least a second one of the classification labels within the group;

selecting a first one of the properties to generate and output a first question to a user as part of a computer-guided conversation with the user for resolving ambiguity of the computer-based object recognition process with respect to the at least one object, wherein said selecting is based at least in part on information indicating a level of prior knowledge of the user regarding (i) each of the one or more properties and (ii) each of the one or more classification labels;

assigning a belief score to an answer input by the user in response to the first question, wherein the belief score is based at least in part on the level of prior knowledge of the user regarding the first property;

determining whether to present at least a second question to the user to verify the answer based at least in part on a comparison of the belief score to a belief threshold value; and removing at least one of (i) the first classification label and (ii) the second classification label from the group of classification labels when the belief score exceeds the threshold value.

20. The system of claim 19, wherein the at least one processor is further configured to perform:

in response to said removing, adjusting one or more of the confidence values for the classification labels in the group; and in response to determining that one of the adjusted confidence values exceeds the confidence threshold, classifying the object using the corresponding classification label.

\* \* \* \* \*